United States Patent Office 3,219,645
Patented Nov. 23, 1965

3,219,645
CATALYST AND PROCESS FOR THE POLYMERIZATION OF 1-BUTENE
Roger M. Nagel, Pennington, and Maigonis Gabliks, New Brunswick, N.J., assignors to Petro-Tex Chemical Corporation, Houston, Tex., a corporation of Delaware
No Drawing. Filed Apr. 10, 1961, Ser. No. 101,671
3 Claims. (Cl. 260—93.7)

This invention relates to the polymerization of butene-1 and relates more particularly to an improved method for polymerizing butene-1 with a titanium halide, a trialkyl aluminum compound and a copper halide.

The polymerization of olefins with catalyst compositions of transition metal compounds such as the titanium halides and alkyl aluminum compounds is well known. For example, ethylene has been polymerized to high molecular weight solid polymer with triethyl aluminum and titanium tetrachloride. However, such catalyst systems have not been satisfactorily employed to provide commercial polybutene. It has now been found that butene-1 can be polymerized to useful high molecular weight isotactic polymers in the presence of a novel catalyst comprising titanium tetrachloride, a trialkyl aluminum compound and a copper halide, at a much faster rate than when such polymerizations are conducted in the absence of the added copper halide and isotactic polymers with improved physical properties are thereby obtained.

The trialkyl aluminum component of the catalyst system may be any trialkyl aluminum compound of the formula $R_3Al$, wherein R is a saturated acyclic hydrocarbon radical containing 2 to 10 carbon atoms and including, for example, triethyl aluminum, tripropyl aluminum, tributyl aluminum, triamyl aluminum, trihexyl aluminum, trioctyl aluminum and the like. Excellent results are obtained with trialkyl aluminum compounds wherein the alkyl groups contain 2 to 4 carbon atoms.

The copper halide component of the catalyst may be, for example, cuprous chloride, cupric chloride, cuprous fluoride, cupric fluoride, cuprous iodide, cupric iodide, cuprous bromide or cupric bromide. It was found, quite unexpectedly, that the cuprous halides were unique in effect in the catalyst system of this invention. While cupric chloride is useful in the process of this invention, higher yields of isotactic polybutenes are obtained with cuprous chloride. The chlorides and fluorides are preferred.

In the catalyst complex, the ratio of constituents may be varied within the following ranges. Based on one mol of titanium halide, the trialkyl aluminum compound may be varied from about 0.5 mol to 5 or even 10 mols. However, it is an unexpected advantage of this invention that the ratio of trialkyl aluminum compound to titanium tetrachloride may be quite low. For example, when butene-1 is polymerized with triethyl aluminum and titanium tetrachloride in a molar ratio of about one mol of triethyl aluminum to about one mol of titanium tetrachloride, the polymerization rate is slow, the ultimate polymer yield is low and the physical properties of the resulting polybutene polymers are poor. When, however, in accordance with this invention, the catalyst also includes about one-third mol of a copper halide per mol of trialkyl aluminum, as cuprous chloride, increased yield of polybutene having improved physical properties is obtained, and such yield increase and improved polymer obtained with such catalyst system are better than that obtained when polybutene is prepared from a catalyst containing 3 mols of trialkyl aluminum to one mol of titanium tetrachloride. Preferably, the molar ratio of trialkyl aluminum to titanium tetrachloride is from 1 to 1 to about 4 to 1. The amount of copper halide employed in the catalyst complex may be varied, and while very small amounts of copper halide will give some improvement, normally an amount from about 0.1 to about one mol of copper halide per mol of titanium tetrachloride will be employed.

In using the catalyst a number of procedures may be employed. For example, the trialkyl aluminum compound in an inert solvent may be added to the titanium tetrachloride and the copper halide in an inert solvent added thereto, or the titanium tetrachloride and copper halide may be mixed together and the trialkyl aluminum compound added thereto, normally in an inert organic solvent. Hydrocarbons are normally employed as the inert organic solvent. While the catalyst complex may be prepared at temperatures over a wide range, it normally will be prepared between about 30° C. and 150° C.

The amount of catalyst used may be varied quite widely and may be as low as 0.01 weight percent based on the weight of the monomer to be polymerized, but normally will be in the range of about 0.5 to about 5 to 10 weight percent based on the weight of the monomer to be polymerized.

The polymerization of the butene-1 is normally conducted at temperatures below 250° C. and at pressures below 150 atmospheres, and usually is at temperatures between about 25° C. and 150° C. at about 1 to 50 atmospheres. Improved polymerization rates and polymers are obtained with mixtures of butene-1 and other olefins including propene, 3-methyl butene-1 and the like and including copolymers such as butene-1 with ethylene. The novel catalyst system of this invention is particularly advantageous in preparing copolymers of diolefins and α-olefins such as butene-1 and butadiene-1,3. The novel catalyst system may be used in both batch and continuous polymerization processes.

The polymerization reaction may be conducted in bulk but normally will be with an inert diluent. Preferred are inert liquid hydrocarbons and the alkanes such as propane, butane, pentane, heptane and the like are usually employed but such materials as isooctane, cyclohexane, benzene, toluene and the like are also useful.

The polymer formed in accordance with the process of this invention is recovered after stopping the polymerization by deactivating the catalyst as with an alcohol. The polymer is then separated as by filtration, washed and dried.

*Examples 1 through 4*

24 millimols of titanium tetrachloride and an amount of copper halide set forth in the table below were added to 200 ml. of n-heptane in a stirred reaction flask and this mixture heated to about 88° C. to 94° C. 26 millimols of triethyl aluminum in 200 ml. of n-heptane was then added to the reactor over a 20 minute period and after all the triethyl aluminum was added the mixture was aged for 20 minutes at 90° C. to 94° C. Butene-1 was added to the reactor gradually and intermittently and the reaction was conducted for 4 hours at a reaction temperature ranging from 91° C. to 68° C. The reaction was terminated by adding alcohol to the reaction mixture and the polybutene was separated from the n-heptane dispersion by taking it up in toluene, washing it with aqueous HCl and water, precipitating the polymer with methanol and drying. Polybutene was obtained in the yields set forth in the table below and the resulting polybutenes had the physical properties set forth in the table.

| Run | Copper Halide | Amount, mMols | Yield, Grams | Melt Index | Density | Torsional Modulus, p.s.i. | Tensile Modulus 0% Elongation, p.s.i. | Yield Point |
|---|---|---|---|---|---|---|---|---|
| 1 | None | 0 | 80 | 4.2 | 0.892 | Too Soft | 6,190 | 431 |
| 2 | CuCl | 4.0 | 122 | 3.6 | 0.901 | 5,000 | 17,000 | 1,005 |
| 3 | CuCl | 8.0 | 90 | 4.3 | 0.906 | 11,400 | 22,200 | 1,465 |

When Run 3 above is repeated with cupric chloride in place of cuprous chloride (Run 4), 18 grams of isotactic polybutene is obtained. This polymer has good physical properties comparable to those set forth in the table above obtained with cuprous chloride.

Through the use of cuprous halide, a trialkyl aluminum and titanium tetrachloride, significant increases in rate of polymerization and yield of polymer are obtained even when the molar ratio of trialkyl aluminum to titanium halide is low, which low ratio of these two reactants represents a significant saving in cost and simplifies subsequent processing of the polymer. More important, by means of the novel catalyst of this invention an improved isotactic polymer is obtained as is clearly demonstrated in the examples above. The improved polybutenes obtained as defined find many commercial uses. Polybutene so prepared is readily formed into valuable film materials and pipe.

We claim:

1. A method for polymerizing butene-1 in increased yields which comprises contacting butene-1 with a catalyst consisting essentially of titanium tetrachloride, a trialkyl aluminum compound wherein the alkyl groups contain 2 to 10 carbon atoms and cuprous chloride in a molar ratio of one mol of titanium tetrachloride, about 1 to 4 mols of trialkyl aluminum and about 0.1 to 1.0 mol of cuprous chloride per mol of titanium tetrachloride.

2. The method of claim 1 wherein the trialkyl aluminum contains alkyl groups containing 2 to 4 carbon atoms.

3. A catalyst exhibiting increased activity for polymerizing butene-1 which consists essentially of titanium tetrachloride, cuprous chloride and a trialkyl aluminum compound wherein the alkyl groups contain 2 to 10 carbon atoms in a molar ratio of one mol of titanium tetrachloride, about 1 to 4 mols of trialkyl aluminum compound, and about $1/10$ to one mol of cuprous chloride.

References Cited by the Examiner

UNITED STATES PATENTS

| 2,887,471 | 5/1959 | Shearer et al. | 260—93.7 |
| 2,925,392 | 2/1960 | Seelbach et al. | 252—429 |
| 2,964,510 | 12/1960 | Seelbach et al. | 260—93.7 |
| 2,980,664 | 3/1961 | Stuart | 252—429 |
| 3,042,626 | 7/1962 | Bruce et al. | 252—429 |

FOREIGN PATENTS

| 827,516 | 2/1960 | Great Britain. |
| 837,251 | 6/1960 | Great Britain. |

TOBIAS E. LEVOW, *Primary Examiner.*

JULIUS GREENWALD, SAMUEL H. BLECH,
*Examiners.*